US011068001B2

(12) United States Patent
Elie-Dit-Cosaque et al.

(10) Patent No.: US 11,068,001 B2
(45) Date of Patent: Jul. 20, 2021

(54) SYSTEM FOR DETECTING AND INDICATING CONTAINER VOLUME VARIATIONS

(71) Applicant: STERIS Inc., Temecula, CA (US)

(72) Inventors: Xavier Elie-Dit-Cosaque, Sainte-Brigitte-de-Laval (CA); Hugo St-Jean, Quebec (CA); Louis-Philippe Gaudreau, Quebec (CA); Daniel Rochette, Quebec (CA); Luc Tremblay, Quebec (CA); Jaime Estevez, Quebec (CA)

(73) Assignee: STERIS Inc., Temecula, CA (US)

( * ) Notice: Subject to any disclaimer, the term of this patent is extended or adjusted under 35 U.S.C. 154(b) by 42 days.

(21) Appl. No.: 16/379,003

(22) Filed: Apr. 9, 2019

(65) Prior Publication Data
US 2020/0326731 A1 Oct. 15, 2020

(51) Int. Cl.
*G05D 7/06* (2006.01)
*G05B 15/02* (2006.01)

(52) U.S. Cl.
CPC ........... *G05D 7/0676* (2013.01); *G05B 15/02* (2013.01)

(58) Field of Classification Search
CPC .................. A61L 2202/24; A61L 2/28; G01N 2021/6417; G01N 2021/6439; G01N 21/6428; G01N 21/6486; G01N 21/94; G01N 2201/06113; G01N 2201/068; G01N 2201/0697; G01N 2201/10; G01N 2201/105; A47L 15/4418; A47L 15/4463; D06F 39/022; G01F 15/063; G01F 23/20; G05B 15/02; G05D 7/0676
See application file for complete search history.

(56) References Cited

U.S. PATENT DOCUMENTS

| | | | |
|---|---|---|---|
| 4,869,104 A | | 9/1989 | Saito et al. |
| 4,982,606 A | * | 1/1991 | Adamski ............... G01F 23/263 73/304 C |
| 5,014,211 A | * | 5/1991 | Turner ............... B01F 15/0416 137/266 |

(Continued)

FOREIGN PATENT DOCUMENTS

WO WO 2017/089883 A1 6/2017

OTHER PUBLICATIONS

International Search Report and Written Opinion from corresponding International Application No. PCT/US2020/027222 dated Jul. 15, 2020.

*Primary Examiner* — Kidest Bahta
(74) *Attorney, Agent, or Firm* — Kusner & Jaffe (57) ABSTRACT

A system for detecting and indicating variations in volume of chemicals in a container is provided. The system includes a retention basin configured to retain the container. The retention basin includes a pressure cell, a basin input interfaces, and a basin controller. The pressure cell is configured to measure a weight of the container. The container is placed on the pressure cell. The basin input interface is configured to allow specification of properties of the chemicals in the container. The basin controller is configured to calculate the volume of the chemicals in the container based on the measured weight of the container and the specified properties of the chemicals in the container. The basin controller includes a basin display configured to display the calculated volume of the chemicals in the container.

16 Claims, 5 Drawing Sheets

(56) References Cited

U.S. PATENT DOCUMENTS

| | | | |
|---|---|---|---|
| 5,423,781 A | 6/1995 | Alexander et al. | |
| 6,920,401 B2 | 7/2005 | Rameau et al. | |
| 9,212,042 B2 | 12/2015 | Veltrop et al. | |
| 2004/0226961 A1 | 11/2004 | Mehus et al. | |
| 2005/0177274 A1* | 8/2005 | O'Dougherty | G05D 7/0617 |
| | | | 700/231 |
| 2007/0062270 A1* | 3/2007 | Misra | G01G 17/04 |
| | | | 73/149 |
| 2008/0213874 A1* | 9/2008 | Mitchell | G01F 23/20 |
| | | | 435/287.1 |
| 2010/0213279 A1* | 8/2010 | Frederick | B05B 1/18 |
| | | | 239/310 |
| 2011/0192433 A1 | 8/2011 | Harris et al. | |
| 2015/0002301 A1* | 1/2015 | Rietsch, Jr. | G01F 23/2962 |
| | | | 340/621 |
| 2015/0233753 A1* | 8/2015 | Tincher | G01F 23/243 |
| | | | 73/1.73 |
| 2015/0287313 A1* | 10/2015 | Silvers | G01F 22/00 |
| | | | 340/618 |
| 2016/0163175 A1 | 6/2016 | Jenkins | |
| 2017/0048325 A1 | 2/2017 | Tincher | |
| 2017/0315010 A1 | 11/2017 | Sulzer et al. | |

\* cited by examiner

SYSTEM FOR DETECTING AND INDICATING CONTAINER VOLUME VARIATIONS

FIELD OF THE INVENTION

The present invention relates generally to a system for supplying chemicals to a washing device, and, more particularly, to a system that can detect a volume of chemicals in a container during operation of a washing device.

BACKGROUND OF THE INVENTION

Washing devices of a central services department (CSD) of a hospital are generally connected to chemical containers located next to the washing devices or in another room that is near the washing devices. Due to safety standards, these chemical containers are located on retention basins.

When a cycle of a washing device requires an injection of chemicals from a container, a dosing system of the washing device transfers the chemicals from the container to the washing device. The dosing system can either be embedded in the washing device or positioned outside the washing device. The dosing system may include a variety of components, such as, but not limited to, perylstatic pumps, piping, and flow sensors.

The dosing system is designed to guarantee that the volume of the chemicals injected into the washing device corresponds to the volume of chemicals required for the specific operation inside the washing device. Conventionally, this volume is verified through a variety of methods. In one example, pumps in charge of pumping chemicals from the container to the washing device are calibrated so that a given amount of pump operation time corresponds with a specific volume of chemicals that is transferred to the washing device. In another example, a flow sensor placed inside the piping of the dosing system detects several pulses when the chemicals are being transferred through the piping. Depending on the calibration of the transfer system, a number of pulses detected corresponds to a given volume of chemical delivered to the washing device. Specifically, in the cleaning of medical devices, it is common to find dosing systems employing both of the above-referenced examples to confirm the volume of the chemicals delivered to the washing device for regulatory purposes.

However, the ultra-concentrated chemicals transported to the washing device are in direct contact with the flow sensors disposed within the piping, thereby subjecting the flow sensors to damage.

Further, the pressure on CSDs to respect regulatory standards increases on a consistent basis. Time-based verification and verification through flow sensors provide no method by which control of chemical delivery can be verified visually. As a result, it has become necessary for CSDs to even further verify the amount of chemicals transferred into the washing device through visual and primitive means, such as, for example, drawing a line on a container and routinely checking the container to see if the amount of chemicals in the container has lessened since the line was drawn. This requires extra resources and can make the volume confirmation susceptible to human error.

The present invention provides an improved system for determining the volume of a liquid within a container. Specifically, the present invention addresses situations in which accurate determination and verification of an amount of chemicals in a container are required for regulatory purposes. The present invention addressed such situations in a way to eliminate manual confirmations of volume and avoid the use of instrumentation in a way that require exposure of the instrumentation to ultra-concentrated chemicals.

SUMMARY OF THE INVENTION

In accordance with one embodiment of the present invention, there is provided a system for detecting and indicating variations in volume of chemicals in a container. The system includes a retention basin configured to retain the container. The retention basin includes a pressure cell, a basin input interfaces, and a basin controller. The pressure cell is configured to measure a weight of the container. The container is placed on the pressure cell. The basin input interface is configured to allow specification of properties of the chemicals in the container. The basin controller is configured to calculate the volume of the chemicals in the container based on the measured weight of the container and the specified properties of the chemicals in the container. The basin controller includes a basin display configured to display the calculated volume of the chemicals in the container.

In accordance with another embodiment of the present invention, there is provided a system for detecting and indicating variations in volume of chemicals in a container. The system includes a retention basin and a system controller. The retention basin is configured to retain the container. The retention basin includes a pressure cell, a basin communication interface, and a basin display. The pressure cell is configured to measure a weight of the container, the container being placed on the pressure cell. The basin communication interface is configured to wirelessly communicate the measured weight of the container and receive a calculation of the volume of the chemicals in the container. The basin display is configured to display the calculated volume of the chemicals in the container. The system controller includes a central processing unit, a controller communication interface, a controller input interface, and a controller display. The central processing unit is configured to calculate the volume of the chemicals in the container based on the measured weight of the container and properties of the chemicals in the container. The controller communication interface is configured to wirelessly communicate with the basin communication interface to receive, from the basin communication interface, the measured weight of the container and send, to the basin communication interface, the calculated volume of the chemicals in the container for display by the basin display. The controller display is configured to display the calculated volume of the chemicals in the container. The controller input interface is further configured to allow management of the controller display.

An advantage of the present invention is that wireless communication can be used to transfer data from the retention basin on which the container is positioned to a washing device or a controller. This makes chemical supply adjustments easier and enables remote monitoring of the volume of chemicals in the container.

Another advantage of the present invention is that a pressure cell can be used in a retention basin mounted to a wall. This enables easier maintenance and administration of the container, the retention basin on which the container sits, and the components of the retention basin.

An additional advantage of the present invention is that, in at least one embodiment, a retention basin includes one or more basin displays that correspond with measurements taken by a respective pressure cells. This improves the methods by which local monitoring on container volume can be performed.

These and other advantages will become apparent from the following description of illustrated embodiments taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

Referring now to the drawings wherein the showings are for the purposes of illustrating an embodiment of the invention only and not for the purposes of limiting same, FIGS. 1-5 illustrate various examples of first and second embodiments of detergent supply system 2. Among various different functions, system 2 detects and indicates variations in volume of chemicals in one or more containers 4. Types of containers 4 may include, but are not limited to, plastic jugs or other plastic and portable chemical media storage.

In a first embodiment, system 2 includes retention basin 6. Retention basin 6 is designed to retain container 4. Retention basin 6 may be plastic or another lightweight material, but is not limited thereto. Retention basin 6 may be configured to retain various different types or brands of containers 4. Retention basin 6 may also be configured to exclusive retain a specific type or brand or container 4.

Retention basin 6 includes pressure cell 14, basin input interface 40, and basin controller 16. Pressure cell 14 is designed to measure a weight of container 4, which is placed on pressure cell 16 when retained by retention basin 6. Retention basin 6 is further used to protect pressure cell 14 from being overloaded by the weight of container 4. Basin input interface 40 is liquid-proof and is used to allow a user to specify the properties of the chemicals in container 4. Basin controller 16 is also liquid-proof and is used to calculate the volume of the chemicals in container 4 based on the measured weight of container 4 and the specified properties of the chemicals in container 4. Basin controller 16 includes basin display 17, which is also liquid-proof and used to display the calculated volume of the chemicals in container 4. Basin display 17 may be electronic, such as an LCD or LED display, or mechanical, such as a dial reading.

Figure 2:
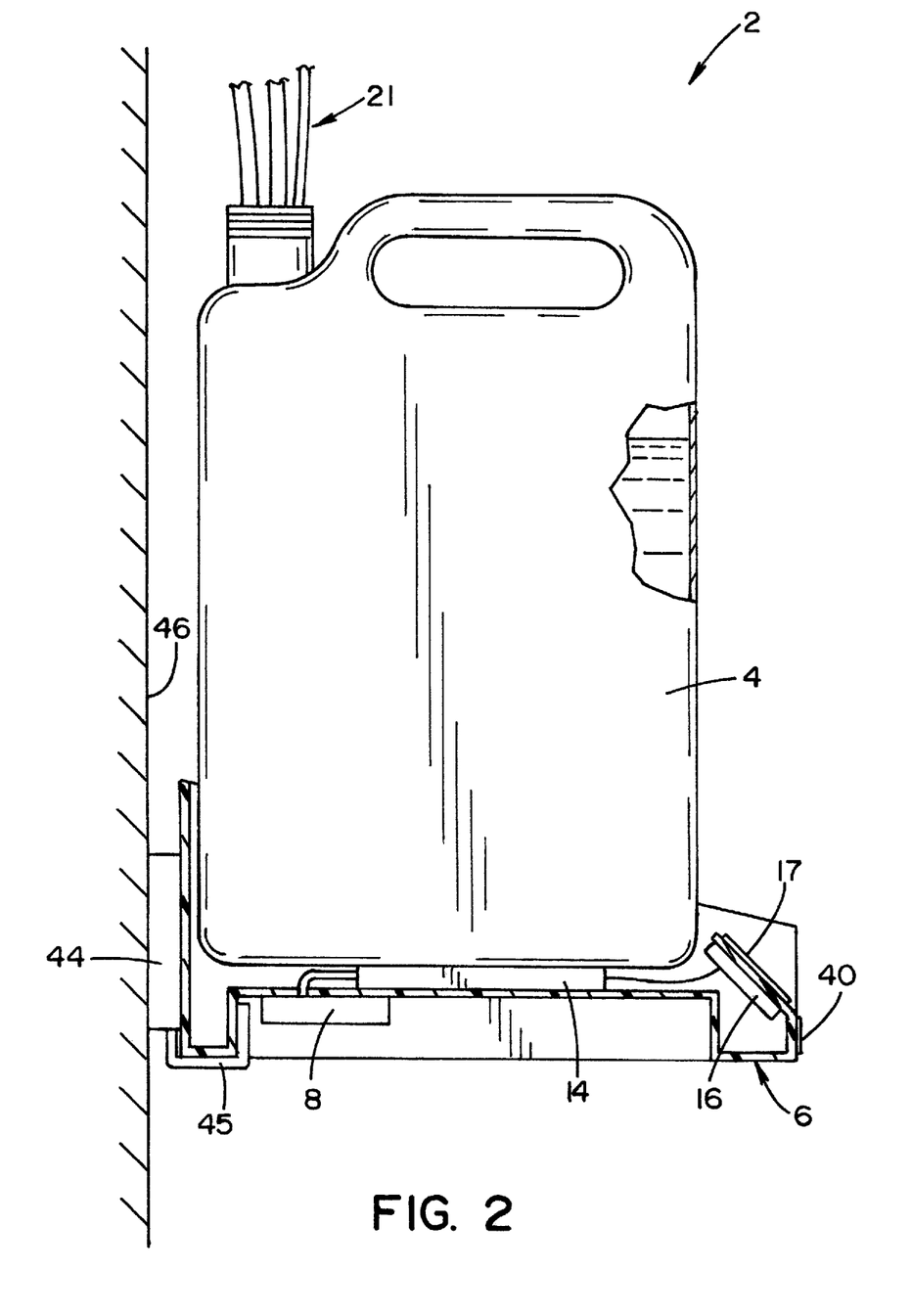
FIG. 2 is a sectional view across a section 2-2 of a retention basin illustrated in FIG. 1 according to a first embodiment of the present invention.
Figure 3:
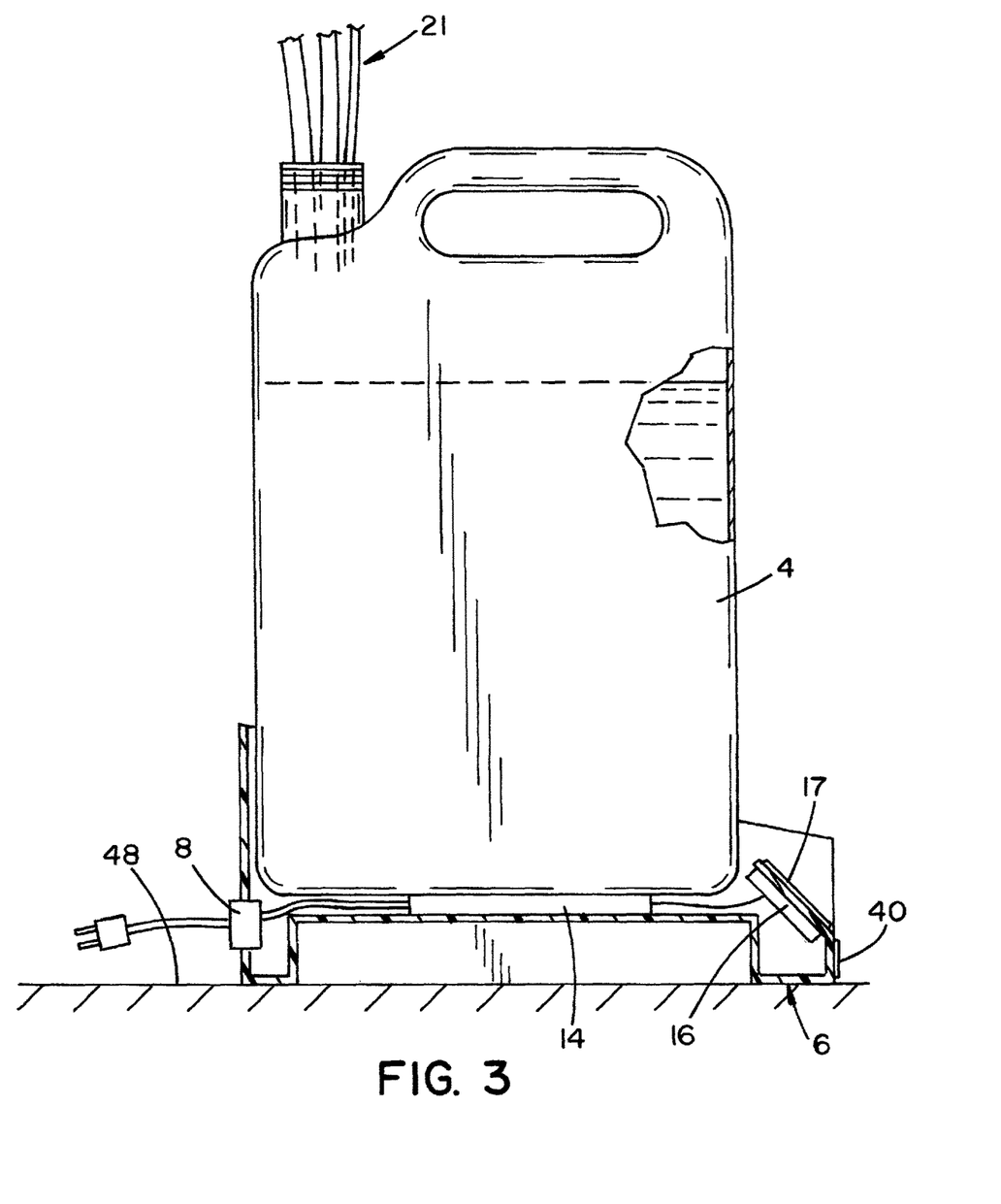
FIG. 3 is a sectional view across a section 2-2 of a retention basin illustrated in FIG. 1 according to a modified first embodiment of the present invention.

It is noted that the electronic devices of retention basin 6 are powered through power supply 8. Power supply 8 is illustrated in FIG. 2 as being a battery. Power supply 8 is illustrated in FIG. 3 as requiring an AC voltage source. However, embodiments described herein are not limited to either type of power supply.

In one example, system 2 may further include washing device 26 and pick-up tubes 21. Washing device 26 is used to apply the chemicals in container 4 to contents disposed in washing device 26, such as, but not limited to, medical devices or medical instruments. Washing device 26 may include washing device communication interface 30. Washing device communication interface 30 is used to wirelessly communicate via basin/washer communication connection 20 with retention basin 6.

In the above-referenced example, pick-up tubes 21 are used to transfer the chemicals in container 4 to washing device 26. Retention basin 6 may further include basin communication interface 18. Basin communication interface 18 is used to wirelessly communicate with washing device communication interface 30 of washing device 26 via basin/washer communication connection 20 regarding the calculated volume of the chemicals in container 4, withdrawal of the chemicals in container 4 through pick-up tubes 21, and application of the withdrawn chemicals to the contents disposed in washing device 26. Basin communication interface 18 may include, but is not limited to, a wireless modem or a wireless router.

In another example, pick-up tubes 21 optionally include one or more level sensors 38 positioned therein. Level sensors 38 are used to detect an amount of the chemicals remaining in container 4 and communicate the detected amount to basin controller 16.

It is noted that level sensors 38 are not required for operation of system 2, as use of level sensors 38 in applications in which system 2 is employed still possesses the drawbacks previously mentioned with respect to conventional art. System 2 is designed to provide accurate volume levels without any assistance from level sensors 38 or the like. However, in view of the aforementioned increase in regulatory accountability, level sensors 38 may provide an extra sense of security and confirmation for the CSDs. Level sensors 38 may be powered by power supply 8 or other means independent from retention basin 6.

In an additional example, system 2 may include mounting bracket 44 mounted to wall 46. Mounting bracket 44 may include hook 45 that is used to secure retention basin 6 to mounting bracket 44. It is noted that the embodiments disclosed herein are not limited to retention basin 6 being mounted to wall 46. For example, as illustrated in FIG. 3, retention basin 6 may be positioned on support surface 48. An example of support surface 48 may include, but is not limited to, a floor or a table.

In a further example, basin input interface 40 is further used to allow a user to specify a desired operation of basin display 17. Basin controller 16 is used to control basin display 17 according to the desired operation of basin display 17 specified by the user through basin input interface 40. For example, in addition to allowing a user to specify the properties of the chemicals in container 2, basin input interface 40 may allow the user to switch between Imperial and Metric volume units in an electronic or a mechanical implementation of basin display 17.

In another example, system 2 may further include system controller 24. System controller 24 is powered by controller power supply 36 using any means known to those having ordinary skill in the art. System controller 24 is used to remotely monitor the calculated volume of the chemicals in container 4. System controller 24 may include controller communication interface 28 and controller display 34. Controller communication interface 28 is used to wirelessly communicate with basin communication interface 18 of retention basin 6 via basin/controller communication connection 22 to acquire the calculated volume of the chemicals in container 4. Controller communication interface 28 may include, but is not limited to, a wireless modem or a wireless router. Controller display 34 is used to display the calculated volume of the chemicals in container 4 acquired by controller communication interface 28. It is anticipated that controller display 34 may be an electronic display, but controller display 34 is not limited thereto.

In this example, system controller 24 may further include controller input interface 42 and central processing unit 32. Controller input interface 42 is used to allow a user to specify a desired operation of controller display 34. For example, controller input interface 42 may allow the user to switch between Imperial and Metric volume units. Central processing unit 32 is used to control controller display 34 according to the desired operation specified by the user through controller input interface 42. Controller input interface 42 may resemble any input device known to one having ordinary skill in the art, including, but not limited to, a mechanical or capacitive touch pad, a keyboard, or a video display input device.

Figure 1:
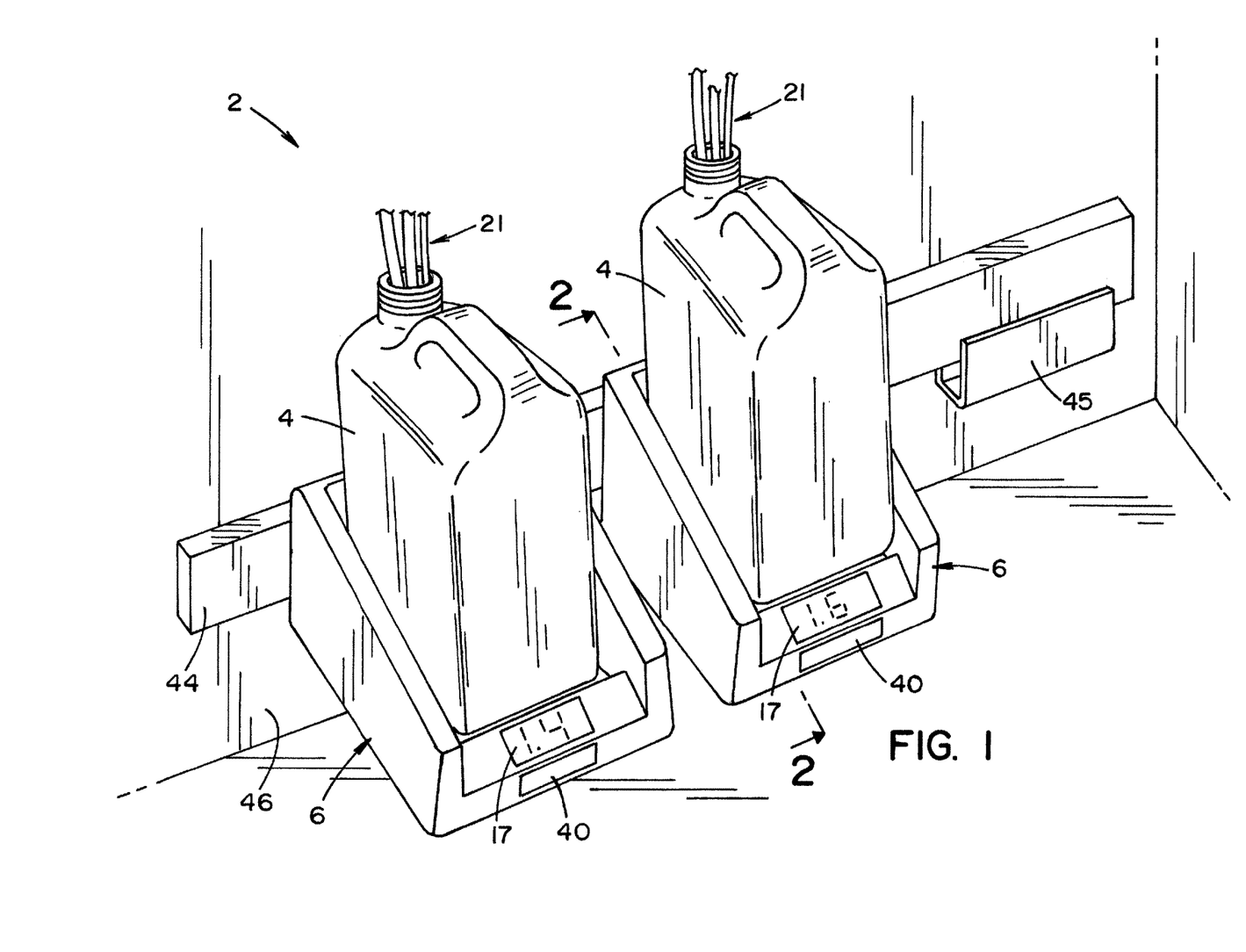
FIG. 1 is a plan view illustrating a detergent supply system according to a first embodiment of the present invention.
Figure 4:
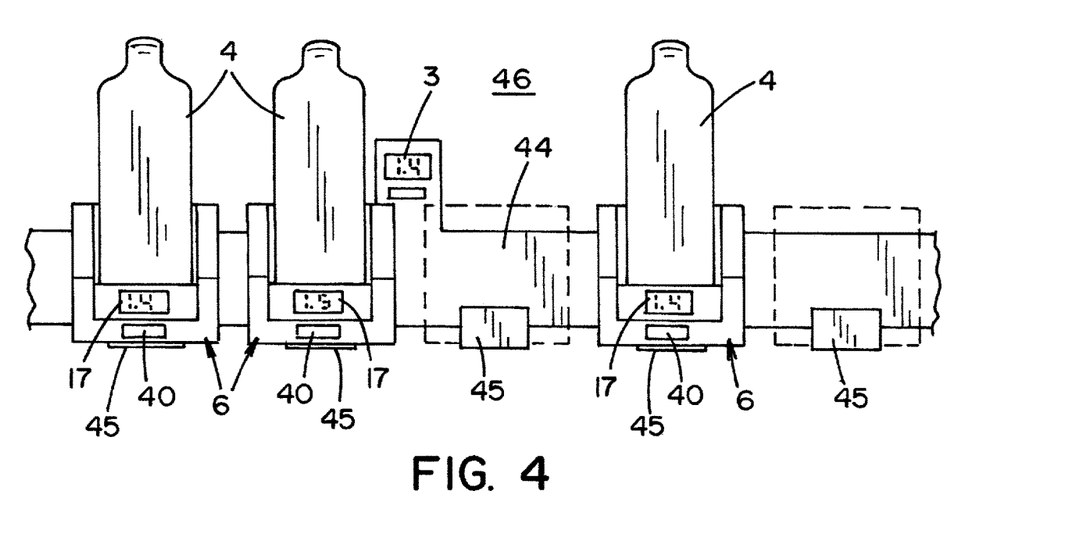
FIG. 4 is a front view illustrating a retention basin according to a second embodiment of the present invention.
Figure 5:
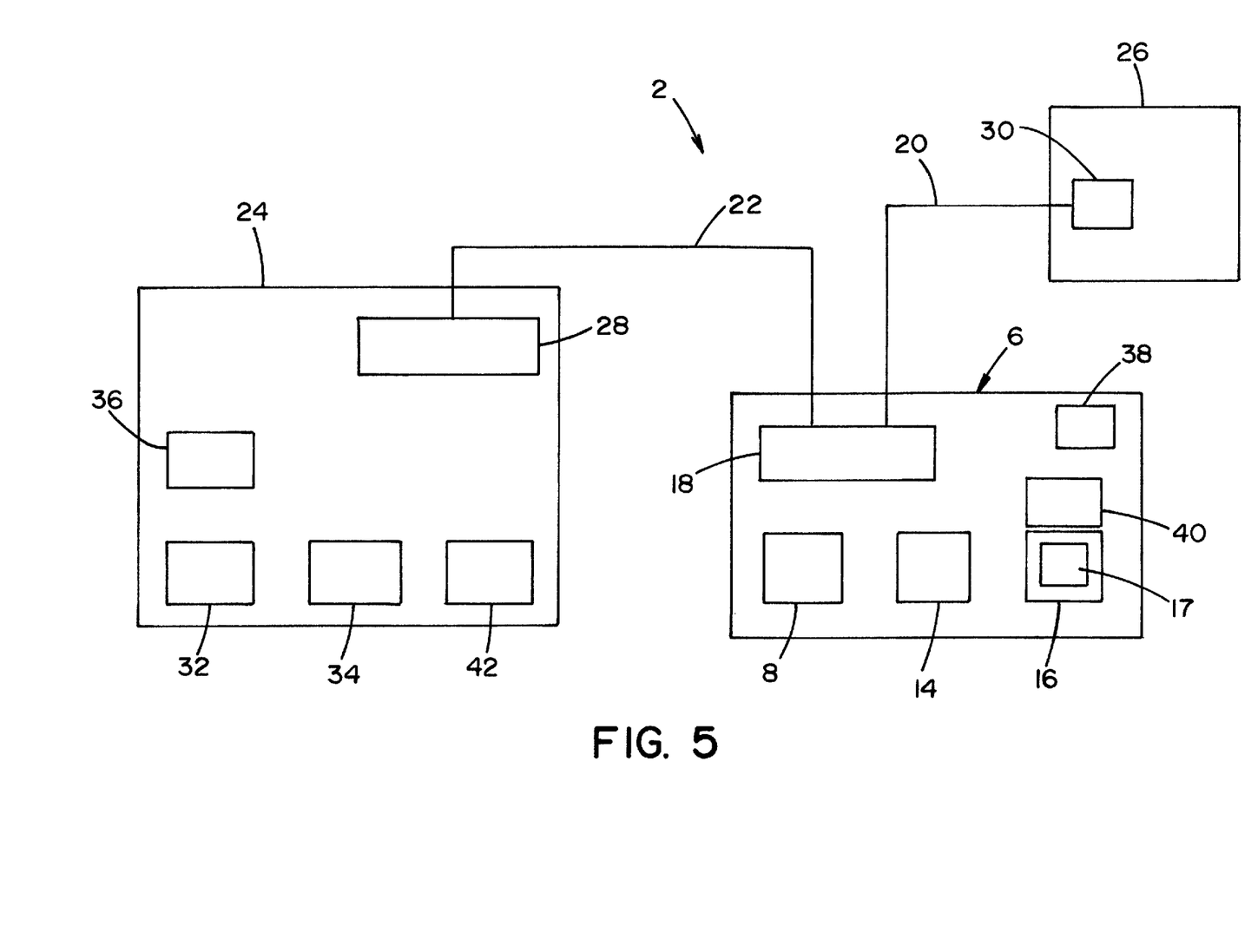
FIG. 5 is a schematic view illustrating a detergent supply system according to various embodiments of the present invention.

It is noted that basin input interface 40 and controller input interface 42 are not limited to specific forms and orientations. For example, basin input interface 40 is illustrated in FIGS. 1 and 4 as being a single push button. However, multiple inputs may conceivably integrated into the button illustrated in FIGS. 1 and 4. Further, basin input interface 40 and controller input interface 42 may have the capability of being remotely controlled through wired means or wireless means. Wired means of remote control may include, but is not limited to, corded input devices. Wireless means of remote control may include, but is not limited to, infrared communication between an input device and interfaces 40 and 42 or wireless communication between an input device, e.g. a mobile phone, and interfaces 40 and 42.

In another example, container 4 may be one of many containers retained by retention basin 6. Pressure cell 14 of retention basin 6 may be one of many pressure cells 14 of retention basin 6. In such cases, pressure cells 14 are used to respectively measure weights of containers 4 placed thereon. Moreover, basin controller 16 is used to calculate a volume of chemicals for each of containers 4 based on the measured weight thereof.

In the example above, basin input interface 40 is further used to allow a user to specify properties of chemicals in each of containers 4. In addition, in lieu of basin displays 17 for each pressure cell 14, as will be described below, centralized basin display 3 can be used to selectively display the volumes related to each of containers 4 on pressure cells 14 in retention basin 6. In such a case, a single basin input interface 40 is further used to allow selection by a user of the calculated volume of the chemicals in one of containers 4 to be displayed by centralized basin display 3. It is anticipated that centralized basin display 3 may be an electronic display, but centralized basin display 3 is not limited thereto.

In another aspect of the example above, which was referred to above, basin input interface 40 may be one of a plurality of basin input interfaces 40. Each of basin input interfaces 40 correspond with one of pressure cells 14. Further, basin controller 16 that has basin display 17 may be one of many basin controllers 16. Each of basin controllers 16 may include basin displays 17 and correspond with one of pressure cells 14. As is illustrated in FIG. 1, it is also contemplated that a similar configuration could be accomplished through multiple applications of separate retention basins 6.

In the second embodiment, which was referred to above, system 2 may include retention basin 6 and system controller 24. Retention basin 6 may be used to retain container 4. In the second embodiment, retention basin 6 may include pressure cell 14, basin communication interface 18, and basin display 17. Pressure cell 14 is used to measure a weight of container 4 that is placed thereon. Basin communication interface 18 is used to wirelessly communicate, via basin/controller communication connection 22, the measured weight of container 4 and receive a calculation of the volume of the chemicals in container 4. Basin communication interface 18 may include, but is not limited to, a wireless modem or a wireless router. Basin display 17 is used to display the calculated volume of the chemicals in container 4. Again, basin display 17 may be electronic, such as an LCD or LED display, or mechanical, such as a dial reading.

In addition, system controller 24 is powered by controller power supply 36 using any means known to those having ordinary skill in the art. System controller 24 further includes central processing unit 32, controller communication interface 28, controller input interface 42, and controller display 34. Central processing unit 32 is used to calculate the volume of the chemicals in container 4 based on the measured weight of container 4 and properties of the chemicals in container 4. Controller communication interface 28 is used to wirelessly communicate with basin communication interface 18 via basin/controller communication connection 22 to receive, from basin communication interface 18, the measured weight of container 4 and send, to basin communication interface 18, the calculated volume of the chemicals in container 4 for display by basin display 17. Controller communication interface 28 may include, but is not limited to, a wireless modem or a wireless router. Controller input interface 42 is used to allow a user to specify the properties of the chemicals in container 4. Controller display 34 is used to display the calculated volume of the chemicals in the container 4. It is anticipated that controller display 34 may be an electronic display, but controller display 34 is not limited thereto. Controller input interface 42 is further used to allow a user to manage controller display 34.

In an example of the second embodiment, retention basin 6 may further include basin input interface 40 that is used to allow a user to specify the properties of the chemicals in container 4 to system controller 24 wirelessly between basin and controller communication interfaces 18 and 28 via basin/controller communication connection 22. Container 4 may be one of many containers 4 retained by retention basin 6. Pressure cell 14 may be one of many pressure cells 14. Pressure cells 14 are used to respectively measure weights of containers 4 placed thereon. Central processing unit 32 is further used to calculate a volume of chemicals for each of containers 4 based on the measure weight thereof.

In one aspect of the above-referenced example, basin and controller input interfaces 40 and 42 are further used to allow a user to specify properties of chemicals in each of containers 4. Basin display 17 is further used to display the calculated volumes of the chemicals in each of containers 4. Basin input interface 40 is further used to allow a user to select the calculated volume of the chemicals in one of containers 4 to be displayed by basin display 17.

In another aspect of the above-referenced example, basin input interface 40 may be one of many basin input interfaces 40. Each of basin input interfaces 40 may correspond with one of pressure cells 14. Basin display 17 may be one of many basin displays 17. Each of basin displays 17 may correspond with one of pressure cells 14 and a corresponding one of basin input interfaces 40.

In another example of the second embodiment, system 2 may further include washing device 26 and pick-up tubes 21. Washing device 26 is used to apply the chemicals in container 4 to contents disposed in washing device 26, such as, but not limited to, medical devices or medical instruments. Washing device 26 may include washing device communication interface 30. Washing device communication interface 30 is used to wirelessly communicate via basin/washer communication connection 20 with basin communication interface 18.

In the above-referenced example, pick-up tubes 21 are used to transfer the chemicals in container 4 to washing device 26. Also, basin communication interface 18 is used to wirelessly communicate with washing device communication interface 30 of washing device 26 via basin/washer communication connection 20 regarding the calculated volume of the chemicals in container 4, withdrawal of the chemicals in container 4 through pick-up tubes 21, and application of the withdrawn chemicals to the contents disposed in washing device 26.

In an additional example of the second embodiment, pick-up tubes 21 optionally include one or more level sensors 38 positioned therein. Level sensors 38 are used to detect an amount of the chemicals remaining in container 4 and communicate the detected amount to system controller 24 wirelessly through basin/controller communication connection 22 between washer c 28 and basin communication interface 18.

In a further example of the second embodiment, central processing unit 32 is further used to establish basin/controller communication connection 22 between controller communication interface 28 and basin communication interface 18 to enable controller communication interface 28 to wirelessly communicate with basin communication interface 18.

As noted above and illustrated in the drawings, system 2 may be embodied in several different ways. For example, system 2 could largely consist of retention basin 6. In such a case, retention basin 6 would not include basin communication interface 18 or would not use basin communication interface 18 if included therein. In addition, many features of the first embodiment can be easily and harmlessly incorporated into the second embodiment. These features may include, but are not limited, centralized basin display 3.

In another example, when both retention basin 6 and system controller 24 are implemented in system 2, software updates to basin controller 16 could be transmitted wirelessly from controller communication interface 28 to basin communication interface 18 over basin/controller communication connection 22. In addition, system controller 24 could be hardware component of a computer system or a software component administered by an overarching central processing unit. Moreover, system controller 24 could be supplied with data storage means in which data regarding the volumes of container 4 could be recorded. Various data ports, such as USB or USB-C compatible ports (not shown), could also be integrated into system controller 24, retention basin 6, and washing device 26 for wired communication therebetween or connection to a printing device (not shown) for paper printing of recorded data or other external data recording devices.

System 2 can be designed to operate in many different ways. One example of an initiation of such a basic operation would involve an initial reset of basin controller 16 and basin display 17 through operation of basin input interface 40. Basin input interface 40 would then be used to specific the type and concentration of chemical being housed within container 4. This may include the specification of a density of the chemical in container 4.

After this, container 4 could be placed on retention basin 6 and, more specifically, on pressure cell 14. Pick-up tubes 21 could then be placed directly into container 4 or into container 4 via shelf mount (not shown) that would assist pick-up tubes 21 in avoiding contact with container 4. After this, a user could again operate basin input interface 40 to indicate the starting volume of the chemicals in container 4 or, if system 2 is programmed to do so, the type of container 4 placed on pressure cell 14, thereby assuming such container 4 would be full. After operation of washing device 26 begins, if washing device 26 uses pick-up tubes 21 to remove chemical from container 4, basin display 17 would display the volume of container 4 when full minus the volume of chemicals removed from container 4.

The foregoing descriptions are example embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:
1. A system for detecting and indicating variations in volume of chemicals in a container, the system comprising:
   a retention basin configured to retain the container, the retention basin comprising:
      a pressure cell configured to measure a weight of the container, the container being placed on the pressure cell;
      a basin input interface configured to allow specification of properties of the chemicals in the container; and
      a basin controller configured to calculate the volume of the chemicals in the container based on the measured weight of the container and the specified properties of the chemicals in the container, the basin controller comprising a basin display configured to display the calculated volume of the chemicals in the container;
   a washing device configured to apply the chemicals in the container to contents disposed in the washing device, the washing device comprising a washing device communication interface configured to wirelessly communicate with the retention basin; and
   pick-up tubes configured to transfer the chemicals in the container to the washing device, the pick-up tubes comprising one or more level sensors positioned therein, the level sensors being configured to detect an amount of the chemicals remaining in the container and communicate the detected amount to the basin controller.

2. The system according to claim 1, wherein the retention basin further comprises a basin communication interface configured to wirelessly communicate with the washing device via the washing device communication interface regarding the calculated volume of the chemicals in the container, withdrawal of the chemicals in the container through the pick-up tubes, and application of the withdrawn chemicals to the contents disposed in the washing device.

3. The system according to claim 1, further comprising:
a mounting bracket mounted to a wall, the mounting bracket comprising a hook that is configured to secure the retention basin to the mounting bracket.

4. The system according to claim 1, wherein the basin input interface is further configured to allow specification of a desired operation of the basin display, and
wherein the basin controller is configured to control the basin display according to the desired operation specified through the basin input interface.

5. The system according to claim 1, further comprising:
a system controller configured to remotely monitor the calculated volume of the chemicals in the container, the system controller comprising:
a controller communication interface configured to wirelessly communicate with a basin communication interface of the retention basin to acquire the calculated volume of the chemicals in the container; and
a controller display configured to display the calculated volume of the chemicals in the container acquired by the controller communication interface.

6. The system according to claim 5, wherein the system controller further comprises a controller input interface and a central processing unit, the controller input interface being configured to allow specification of a desired operation of the controller display, the central processing unit being configured to control the controller display according to the desired operation specified through the controller input interface.

7. The system according to claim 1, wherein the container is one of a plurality of containers retained by the retention basin,
wherein the pressure cell of the retention basin is one of a plurality of pressure cells of the retention basin, the pressure cells of the retention basin being configured to respectively measure weights of the containers placed thereon, and
wherein the basin controller is further configured to calculate a volume of chemicals for each of the containers based on the measured weight thereof.

8. The system according to claim 7, wherein the basin input interface is further configured to allow specification of properties of chemicals in each of the containers,
wherein the basin display is further configured to display the calculated volumes of the chemicals in each of the containers, and
wherein the basin input interface is further configured to allow selection of the calculated volume of the chemicals in one of the containers to be displayed by the basin display.

9. The system according to claim 7, wherein the basin input interface is one of a plurality of basin input interfaces, each of the basin input interfaces corresponding with one of the pressure cells, and
wherein the basin controller having the basin display is one of a plurality of basin controllers, each of the basin controllers having basin displays and corresponding with one of the pressure cells.

10. A system for detecting and indicating variations in volume of chemicals in a container, the system comprising:
a retention basin configured to retain the container, the retention basin comprising:
a pressure cell configured to measure a weight of the container, the container being placed on the pressure cell;
a basin communication interface configured to wirelessly communicate the measured weight of the container and receive a calculation of the volume of the chemicals in the container; and
a basin display configured to display the calculated volume of the chemicals in the container;
a system controller, comprising:
a central processing unit configured to calculate the volume of the chemicals in the container based on the measured weight of the container and properties of the chemicals in the container;
a controller communication interface configured to wirelessly communicate with the basin communication interface to receive, from the basin communication interface, the measured weight of the container and send, to the basin communication interface, the calculated volume of the chemicals in the container for display by the basin display;
a controller input interface configured to allow specification of the properties of the chemicals in the container; and
a controller display configured to display the calculated volume of the chemicals in the container;
a washing device configured to apply the chemicals in the container to contents disposed in the washing device, the washing device comprising a washing device communication interface configured to wirelessly communicate with the basin communication interface; and
pick-up tubes configured to transfer the chemicals in the container to the washing device, the pick-up tubes comprising one or more level sensors positioned therein, the level sensors being configured to detect an amount of the chemicals remaining in the container and communicate the detected amount to the system controller through the basin and controller communication interfaces,
wherein the controller input interface is further configured to allow management of the controller display.

11. The system according to claim 10, wherein the retention basin further comprises a basin input interface configured to allow the specification of the properties of the chemicals in the container to the system controller via the basin and controller communication interfaces.

12. The system according to claim 10, wherein the basin communication interface wirelessly communicates with the washing device via the washing device communication interface regarding the calculated volume of the chemicals in the container, withdrawal of the chemicals in the container through the pick-up tubes, and application of the withdrawn chemicals to the contents disposed in the washing device.

13. The system according to claim 10, wherein the central processing unit is further configured to establish a wireless connection between the controller communication interface and the basin communication interface to enable the controller communication interface to wirelessly communicate with the basin communication interface.

14. The system according to claim 11, wherein the container is one of a plurality of containers retained by the retention basin,
wherein the pressure cell of the retention basin is one of a plurality of pressure cells of the retention basin, the pressure cells of the retention basin being configured to respectively measure weights of the containers placed thereon, and
wherein the central processing unit is further configured to calculate a volume of chemicals for each of the containers based on the measured weight thereof.

15. The system according to claim 14, wherein the basin and controller input interfaces are further configured to allow specification of properties of chemicals in each of the containers,
   wherein the basin display is further configured to display the calculated volumes of the chemicals in each of the containers, and
   wherein the basin input interface is further configured to allow selection of the calculated volume of the chemicals in one of the containers to be displayed by the basin display.

16. The system according to claim 14, wherein the basin input interface is one of a plurality of basin input interfaces, each of the basin input interfaces corresponding with one of the pressure cells, and
   wherein the basin display is one of a plurality of basin displays, each of the basin displays corresponding with one of the pressure cells and a corresponding one of the basin input interfaces.

* * * * *